(12) United States Patent
Whitehead (10) Patent No.: US 9,258,115 B2
(45) Date of Patent: Feb. 9, 2016

(54) SECURING INFORMATION EXCHANGED VIA A NETWORK

(71) Applicant: Verizon Patent and Licensing Inc., Arlington, TX (US)

(72) Inventor: Steven D. Whitehead, Hudson, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 14/027,865

(22) Filed: Sep. 16, 2013

(65) Prior Publication Data

US 2014/0019749 A1 Jan. 16, 2014

Related U.S. Application Data

(62) Division of application No. 12/207,837, filed on Sep. 10, 2008, now Pat. No. 8,559,637.

(51) Int. Cl.
*H04L 9/08* (2006.01)
*H04L 29/06* (2006.01)

(52) U.S. Cl.
CPC .......... *H04L 9/0861* (2013.01); *H04L 63/0428* (2013.01); *H04L 63/0435* (2013.01)

(58) Field of Classification Search
CPC ............. H04L 9/00; H04L 9/006; H04L 9/08; H04L 9/0816–9/0825; H04L 9/0861–9/0863; H04L 9/0869; H04L 2209/08; H04L 63/04; H04L 63/0428; H04L 63/0435; H04L 63/0442; H04L 63/045; H04L 63/062; H04L 63/067; H04L 2463/041; H04L 2463/062
See application file for complete search history.

(56) References Cited

U.S. PATENT DOCUMENTS

| | | | |
|---|---|---|---|
| 5,636,277 A | 6/1997 | Nagahama et al. | |
| 5,640,454 A * | 6/1997 | Lipner et al. | 380/286 |
| 5,870,544 A | 2/1999 | Curtis | |
| 6,052,785 A | 4/2000 | Lin et al. | |
| 6,118,874 A | 9/2000 | Okamoto et al. | |
| 6,134,597 A | 10/2000 | Rieth et al. | |
| 6,449,720 B1 * | 9/2002 | Sprague et al. | 713/171 |
| 7,093,121 B2 | 8/2006 | Barton et al. | |
| 7,194,621 B1 * | 3/2007 | Nguyen et al. | 713/162 |
| 7,200,230 B2 | 4/2007 | Knauft | |
| 7,296,145 B1 * | 11/2007 | Storm | 713/150 |
| 7,302,252 B2 | 11/2007 | Okochi | |
| 7,620,187 B1 | 11/2009 | Didier et al. | |
| 7,627,901 B1 * | 12/2009 | Elliott | 726/26 |
| 2002/0078351 A1 * | 6/2002 | Garib | 713/168 |
| 2002/0138435 A1 * | 9/2002 | Williams et al. | 705/51 |
| 2003/0074456 A1 | 4/2003 | Yeung et al. | |
| 2003/0081785 A1 | 5/2003 | Boneh et al. | |
| 2003/0084339 A1 | 5/2003 | Roginsky et al. | |
| 2003/0172262 A1 | 9/2003 | Curry | |
| 2003/0177422 A1 * | 9/2003 | Tararoukhine et al. | 714/48 |

(Continued)

OTHER PUBLICATIONS

Berners-Lee, et al, "Uniform Resource Identifier (URI): Generic Syntax, RFC 3986," Network Working Group, The Internet Society, http://tools.ietf.org/html/rfc3986, pp. 1-61, Jan. 2005.

*Primary Examiner* — Eric W Shepperd (57) ABSTRACT

A privacy key is provided over a network. An information page is provided over the network. A submission of data that is to be transmitted over the network in response to the information page is detected. A subset of the data is to be encrypted using the privacy key is determined. The privacy key is used to encrypt the subset of the data.

20 Claims, 5 Drawing Sheets

(56) References Cited

U.S. PATENT DOCUMENTS

| | | |
|---|---|---|
| 2004/0064694 A1 | 4/2004 | Lee et al. |
| 2004/0073634 A1 | 4/2004 | Haghpassand |
| 2004/0105549 A1 | 6/2004 | Suzuki et al. |
| 2004/0236962 A1 | 11/2004 | Wong et al. |
| 2005/0091422 A1* | 4/2005 | Minogue et al. .................. 710/8 |
| 2005/0094178 A1 | 5/2005 | Anno |
| 2005/0108519 A1 | 5/2005 | Barton et al. |
| 2005/0117750 A1* | 6/2005 | Rekimoto .................... 380/247 |
| 2005/0278565 A1 | 12/2005 | Frattura et al. |
| 2006/0090074 A1* | 4/2006 | Matoba ........................ 713/171 |
| 2006/0107062 A1 | 5/2006 | Fauthoux |
| 2006/0191000 A1 | 8/2006 | O'Hara, Jr. et al. |
| 2007/0086587 A1* | 4/2007 | Farahat et al. ................... 380/28 |
| 2008/0016333 A1* | 1/2008 | Cao et al. ....................... 713/155 |
| 2008/0031458 A1* | 2/2008 | Raja ............... 380/279 |
| 2008/0066184 A1* | 3/2008 | Ben-Ami et al. ............... 726/27 |
| 2008/0077976 A1* | 3/2008 | Schulz .............................. 726/5 |
| 2008/0101610 A1 | 5/2008 | Birk et al. |
| 2008/0127278 A1* | 5/2008 | Bonar ............................. 725/76 |
| 2008/0244721 A1* | 10/2008 | Barrus et al. ...................... 726/9 |
| 2008/0276098 A1* | 11/2008 | Florencio et al. ............. 713/183 |
| 2009/0147949 A1 | 6/2009 | Kirovski |
| 2009/0249489 A1* | 10/2009 | Livshits et al. .................. 726/26 |
| 2010/0061556 A1 | 3/2010 | Whitehead |
| 2010/0061557 A1* | 3/2010 | Youn et al. .................. 380/279 |
| 2010/0299516 A1 | 11/2010 | Hwang et al. |
| 2011/0314290 A1* | 12/2011 | Fort et al. ...................... 713/176 |

\* cited by examiner

FIG. 1

URI Generic Components

FIG. 2A

URI Components: Example

FIG. 2B

URI Components: Example concatenated

230 http://www.blockDPI.com/highroad_lowroad?name=IP#patent

SECURING INFORMATION EXCHANGED VIA A NETWORK

CROSS REFERENCE TO RELATED APPLICATIONS

This application is a divisional of U.S. patent application Ser. No. 12/207,837, filed on Sep. 10, 2008, which is hereby incorporated by reference in its entirety.

BACKGROUND INFORMATION

Network devices send and receive data to and from other devices over the network. Third parties often have an interest in intercepting and using data transmitted over a network. For example, third parties may wish to gather information about users' behavior or interests to better target advertising, to obtain sensitive user data such as credit card numbers or the like, etc. One method for gathering network data is deep packet inspection (DPI). DPI examines the information within network packets to determine what content a person is accessing or requesting on the network. It may then be possible to provide targeted advertising from an advertisement data store to the person. For various reasons, e.g., privacy concerns, network users may not wish to share information that may be obtained by DPI. However, existing security protocols and mechanisms to block DPI are presently lacking.

For example, one present network security mechanism, Hypertext Transfer Protocol over Secure Socket Layer (HTTPS) has a number of deficiencies. HTTPS is computationally expensive. Use of HTTPS therefore often causes undesirably high latency when users and content providers exchange data. HTTPS is computationally expensive at least because it uses a Secure Socket Layer (SSL) to manage encryption of data sent between two parties between whom a connection has been established. SSL provides for the secure exchange of data by encrypting data to be exchanged using a secret key. Thus, devices that are to exchange data must negotiate the exchange of secret keys according to a predetermined protocol. The negotiation, or setup, required to establish an SSL connection is part of the reason that HTTPS is computationally expensive. Another reason that HTTPS is computationally expensive is that it encrypts all data exchanged between parties while an HTTPS connection is established. Thus, HTTPS requires encryption and decryption computations to be performed even for data that is not unduly sensitive. Moreover, in HTTPS, secret keys are not retained across sessions, but instead are renegotiated each time a new HTTPS connection is established. In sum, HTTPS generally incurs undesirably high computational costs, latencies, etc.

DETAILED DESCRIPTION OF PREFERRED EMBODIMENTS

Figure 1:
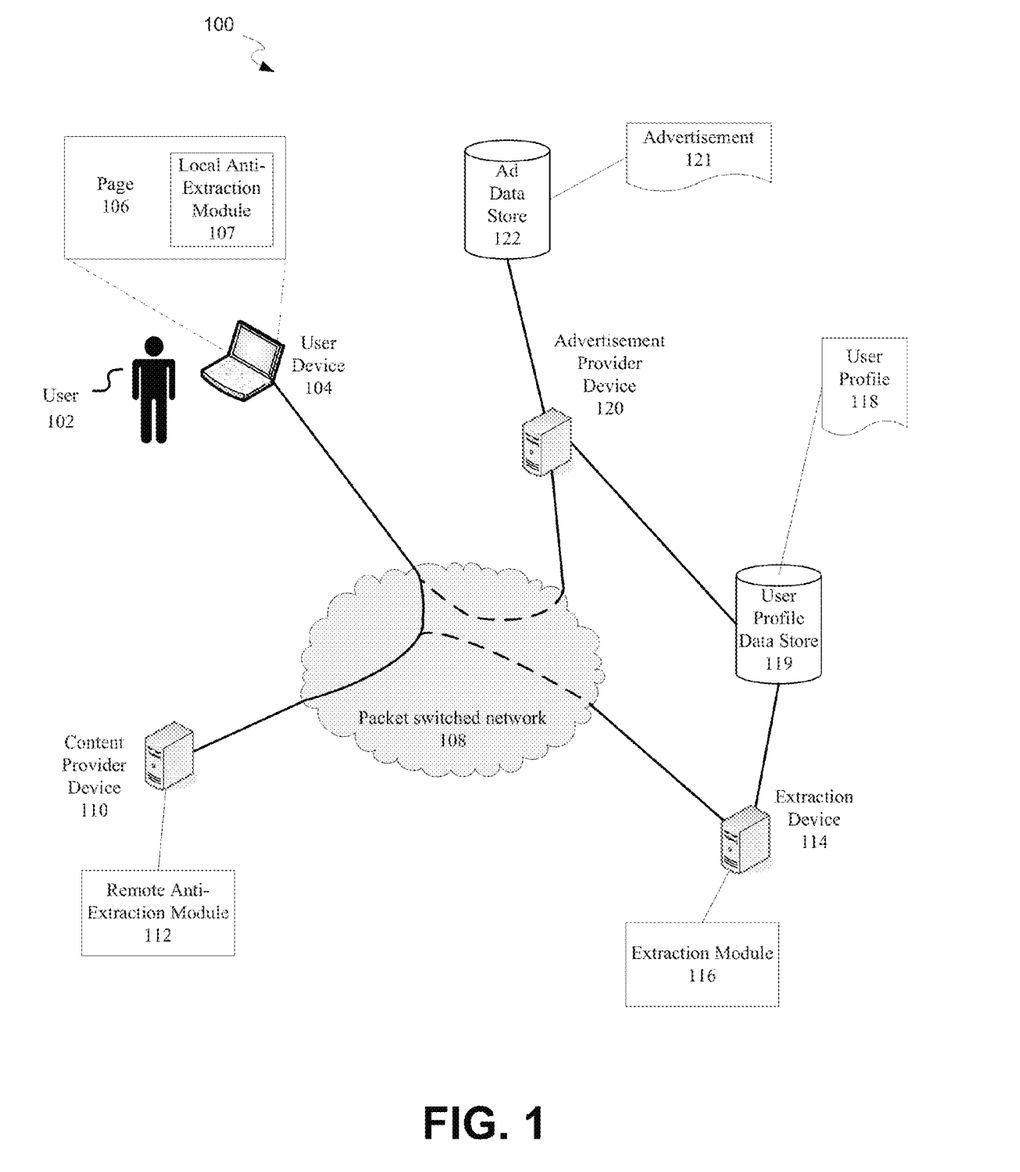
FIG. 1 illustrates an exemplary system for blocking extraction of packet data.

FIG. 1 is an illustration of an exemplary system 100. A user 102, via a user device 104, may access an information page 106 via a packet switched network 108. User 102 may input data into a data entry field on a page 106 for submission to a content provider device 110 and/or to an advertisement provider device 120. Page 106 may include a local anti-extraction module 107, e.g., one or more scripts or other program instructions for interacting with data stored on user device 104 and a remote anti-extraction module 112. Extraction device 114, including extraction module 116, monitors communications over network 108. Extraction device 114 may extract user 102 network access information using extraction module 116 to assemble and/or generate a user profile 118 of network 108 usage by one or more users 102. Remote anti-extraction module 112, generally a set of computer-executable instructions included within content provider device 110, provides a mechanism, possibly in conjunction with local anti-extraction module 107, for blocking extraction module 116 from extracting user 102 data.

Once created, the user profile 118 may be used to deliver targeted advertising tailored to a user 102. User profile 118 may be used immediately, stored for later use, or provided to another entity. For example, profile 118 may be sold to one or more advertisement providers. Advertisement provider device 120 delivers one or more advertisements 121 to user device 104, using the user profile 118 to identify advertisements 121 in the advertisement data store 122 that may be of interest to the user 102, if any. In addition to advertising, there are entities that have interest in gathering user behavior for security purposes or research purposes. For example, owners of intellectual property may wish to monitor network 108 traffic for unauthorized transfer of protected property. Law enforcement officials may want to monitor for indicators of illegal activities. Researchers may want to monitor to gather statistical information. Further, criminals or other third parties may attempt to obtain personal information pertaining to users 102, such as credit card information, financial information, social security numbers, etc. Accordingly, it is to be understood that user profile 118, advertisement provider device 120, advertisements 121, and advertisement data store 122 are discussed to provide an exemplary context for how the systems and methods disclosed herein may be implemented. Other elements could be substituted or included in system 100, such as an e-commerce server receiving credit card data and processing sales transactions, etc.

User 102 generally intends communication only with content provider device 110, even though data to and from user device 104 may be intercepted or monitored by other parties. Therefore, operations that may be performed by extraction device 114, including extraction module 116, are generally undesirable. That is, user 102 generally does not wish to share information that may be obtained by extraction module 116. In order to block device 114 from extracting a user profile 118, content provider device 110 uses a remote anti-extraction module 112 to prevent data packets or the like, traversing network 108, from yielding useful information. For example, content provider device 110 may arrange to have user 102 requests partially or fully encrypted so that the requests provide little or no useful information to a third party using extraction device 114 with extraction module 116.

As discussed further below, remote anti-extraction module 112 may work in concert with local anti-extraction module 107. Page 106 may include one or more scripts or other instructions that make up local anti-extraction module 107, as illustrated in FIG. 1. However, it is also possible that local anti-extraction module 107 includes or is part of an independent computer program or module stored and executed in device 104. For example, page 106 could include instructions for invoking or instantiating such independent computer program or module.

Packet switched network 108 may include a variety of networks such as a wide area network (WAN), e.g., the Internet, a local area network (LAN), etc. Network 108 may be an internet protocol (IP) network. As such, network 108 may use known protocols for transporting data, such as User Datagram Protocol (UDP), Transport Control Protocol (TCP), Hypertext Transfer Protocol (HTTP), etc. As is known, packet switched network 108 may be used to transport a variety of data, including multimedia data such as audio and video. Transmission media connecting devices 104, 110, 114, 120, etc. to the network 108 may include coaxial cables, copper wire and fiber optics, or may include or convey acoustic waves, light waves and electromagnetic emissions, such as those generated during radio frequency (RF) and infrared (IR) data communications.

Devices 104, 110, 114 and 120 generally include, or are in selective communication with, mechanisms for accessing network 108. Such devices are generally computing devices that may employ any of a number of computer operating systems such as are known, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device. Computing devices generally, in addition to a display that usually but not necessarily incorporates a graphical user interface (GUI), includes one or more input devices, such as a pointing device, keyboard or keypad, touch screen, etc.

Computing devices such as user device 104, content provider device 110, extraction device 114, advertisement provider device 120, etc., generally each include instructions, executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. Modules 112 and 116 are generally such instructions. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires and printed circuit board traces that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Content provider device 110 represents any one of one or more devices providing media content (text, video, audio, etc.) and connected to network 108. Device 110 may provide information on demand to a requesting user device 104. Device 110 may provide information to multiple user devices 104 at substantially the same time. Device 110 additionally is configured to receive information from user devices 104. For example, device 110 may be a server on the World Wide Web, providing content such as text, graphics, audio, video, etc., or some combination thereof.

Advertising provider device 120 provides advertising content, e.g., advertisements 121, in response to requests. Such requests may include as parameters information from a user profile 118 or some other source of targeted advertising profile information. The network access provider, for example an internet service provider (ISP) who provides access to user device 104, may request advertising content to display as a banner on the webpage, or in a popup window or other such method of delivering an advertisement 121. Such a request could be made from a computing device operated by the network access provider to an advertisement provider device 120. The advertisement provider device 120 may select the appropriate advertisements 121 from the ad data store 122 and transmit the advertisements 121 to the network access provider computing device to display on information page 106. A network access provider computing device may include the extraction device 114 and the advertisement provider device 120, and may also include the user profile data store 119 and the ad data store 122. Alternatively, the advertisement provider device 120, the extraction device 114, the ad data store 122 and the user profile data store 119 may all be operated by separate entities, and/or included within separate physical computing devices.

Advertising content in the ad data store 122 may include advertisements 121 encoded in one or more multimedia formats. For example, advertising content may be in any one of a number of known formats for multimedia files such as formats according to standards promulgated by the joint photographic experts group (JPEG), the motion picture experts group (MPEG), etc., or some other format, such as known formats for audio content, e.g. waveform audio format (WAV), MPEG-1 Audio Layer 3 (MP3), etc. Further, advertising content is likely associated with advertising metadata sufficient to identify particular items of advertising content, e.g., according to advertisers, categories of advertisement, rate paid for the advertisement 121, subject matter of the advertisement 121, geographic association of the advertisement 121, etc.

User 102 may be an individual person at any location including a user device 104 that provides access to the network 108. User 102 may also represent a group of users targeted as a group. For example, advertisers may be interested in tracking subsequent behavior of all users 102 who access a particular information page 106 provided through the network 108, or a group of users 102 may include all users 102 in a specific geographic area. User profile 118 for a group of users 102 may be a single profile 118 which aggregates the information from the set of users 102. Alternatively, profile 118 may include individual profiles for each user 102 of the group. Where profile 118 relates to a group of users 102, profile 118 may further include links to individual profiles 118 of individual users 102 that are included in the group. User 102 may further represent a LAN that accesses network 108 through a single user device 104, i.e., user 102 may represent all users on the LAN. User 102 may also represent an automated system which accesses network 108 through user device 104 without human intervention. For example, user 102 may be an application on a user device 104 which periodically, or at times determined by program instructions according to criteria other than timing, accesses network 108 to gather updated information useful to the application or to provide updated information to another device 104 on the network.

Information page 106 may be any compilation of information provided by content provider device 110. Page 106 may include multimedia, such as text, images, audio, video, olfactory or tactile media, or any other information format that can be delivered through network 108. Page 106 may be delivered to user 102 through a graphical user interface (GUI) provided by user device 104, or may be left in the network language as received by user device 104, depending on the needs of user 102. Information page 106 may be a web page or the like, such as is known, and may be presented using a markup language such as hypertext markup language (HTML), extensible markup language (XML), etc., possibly in combination with other technologies, such as Microsoft.net, JavaScript, Flash, etc.

User profile data store 119 and ad data store 122 may be implemented using a database. Databases may include a file system on a file server, a relational database management system (RDBMS), etc. An RDBMS generally employs the well known Structured Query Language (SQL) in addition to a language for creating, storing, editing, and executing stored procedures. Other kinds of databases are also possible, such as a hierarchical database, an application database in a proprietary format, etc.

Extraction device 114, including extraction module 116 that generally includes a set of instructions stored on a computer-readable medium with device 114, monitors data that is transmitted through network 108. For example, where network 108 is an IP network, module 116 may examine packets traversing the network 108. For example, module 116 may examine the uniform resource identifier (URI) of the packet in order to extract data from an HTTP request, the body of a web page, an e-mail message, etc. Such data may include search keywords, credit card information, personal identifiers, etc., and is frequently transmitted unencrypted. Thus, extraction module 116 may easily parse and interpret the data. Such data may include user input data, such as keywords for online search services or other data related to user 102 requests to content provider device 110, and may further be added to a user profile 118. Another example of information extraction occurs when module 116 uses the address in an HTTP request URI to access a page 106 indicated by the URI, and then uses a web crawler, spider, etc. to examine the contents of the page 106. Information regarding the contents of the web page 106 may then be added to user profile 118. Extraction of URI content is discussed further below with respect to FIG. 2.

User 102 and an operator of content provider device 110 may not desire for information transmitted via network 108 to be extractable with DPI. Therefore device 110 may include an anti-extraction module 112 to prevent extraction module 116 from extracting usable data from communications in network 108.

Packets within packet switched network 108 may be transmitted in a standard format. One standard data format in common use in the Internet is the URI standard format. For purposes of readability and clarity, this document refers to URIs hereinafter, but it should be clear that any other standard or semi-standard format applies equally well to communications within network 108. As noted above, extraction module 116 could operate on some other portion of a request for a page 106, or on some portion of a page 106 transmitted from content provider device 110 to user device 104 or vice-versa. Thus, URIs are discussed herein for purposes of example and not limitation.

Figure 2A:
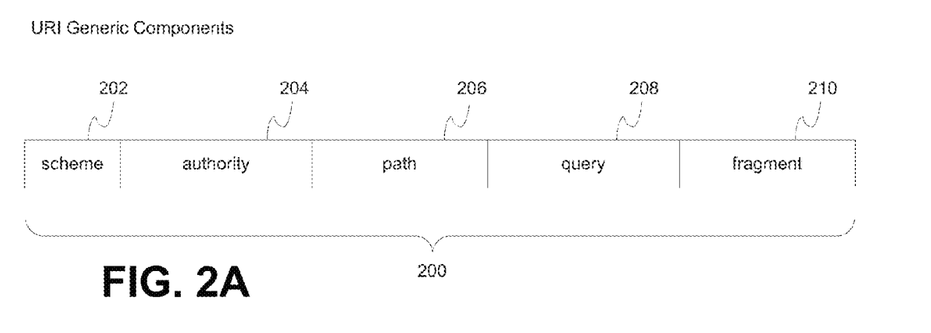
FIG. 2A illustrates a format for a uniform resource indicator (URI)

FIG. 2A illustrates the format for a URI. Further detail concerning URIs may be found in Network Working Group standard RC3986 section 3, The Internet Society, Uniform Resource Identifier (URI): Generic Syntax (January 2005), fully incorporated herein by reference in its entirety. As seen in FIG. 2A, the URI begins with a scheme 202 that provides syntax for the data fields 204, 206, 208 and 210. An authority 204 is used if required by the scheme and provides a naming hierarchy. An example of a naming hierarchy is a World Wide Web address, such as "www.blockDPI.com". A path 206 identifies a specific source of data found at the destination named in the naming hierarchy. A query 208 identifies a primary resource within the path and a fragment 210 identifies a secondary resource related to the primary resource.

Figure 2B:
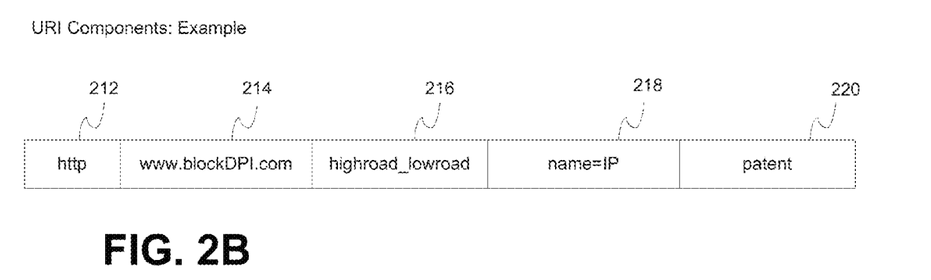
FIG. 2B illustrates exemplary URI components.

FIG. 2B shows exemplary URI components. Components 212-220 are examples of generic components 202-210 respectively. In the example, scheme 212 is "http", authority 214 is "www.blockDPI.com", path 216 is "highroad_lowroad", query 218 is "name=IP" and fragment 220 is "patent".

Figure 2C:
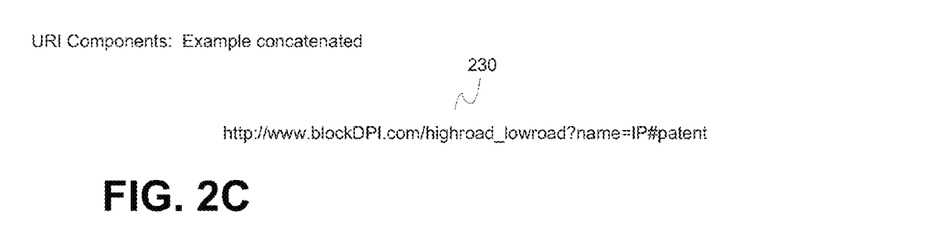
FIG. 2C illustrates an exemplary URI.

FIG. 2C shows items 212-220 used to create an example URI 230. Concatenated and with appropriate delimiters added, components 212-220 form the URI "http://www-.blockDPI.com/highroad_lowroad?name=IP#patent," which identifies a keyword search for "IP" and "patent" at the location "highroad_lowroad" at source "www.blockDPI.com" in the format "http". An extraction module 116 need only identify that scheme 212 is "http", and then extraction module 116 can parse out the keywords by knowing the basic form of each component and the delimiters between components, e.g. the delimiter "#" at the end of the query field.

Figure 3:
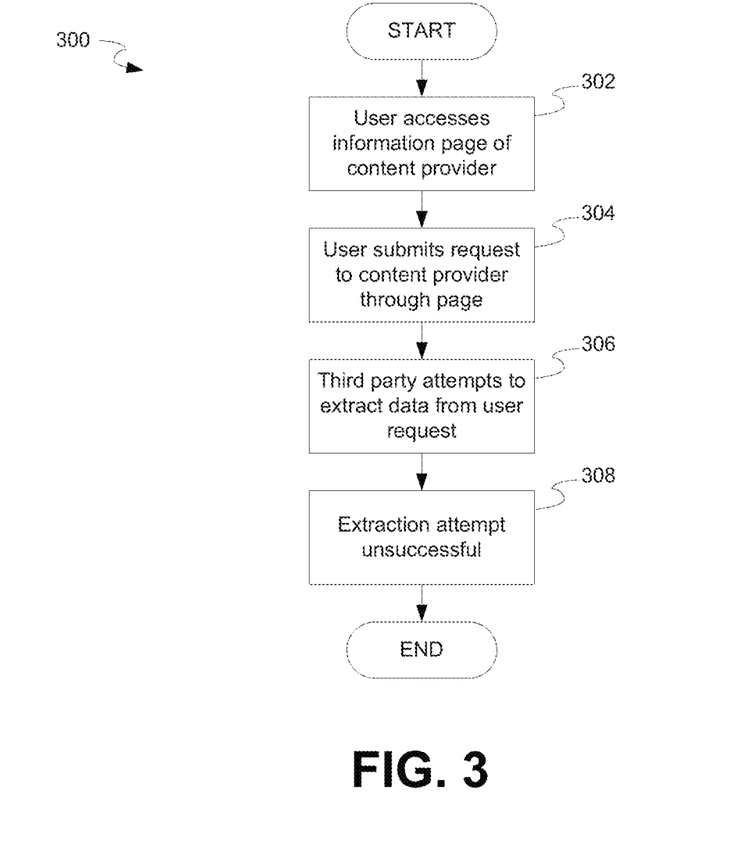
FIG. 3 illustrates an exemplary process in which an anti-extraction module on a content provider device blocks attempts to extract user profiles.
Figure 4A:
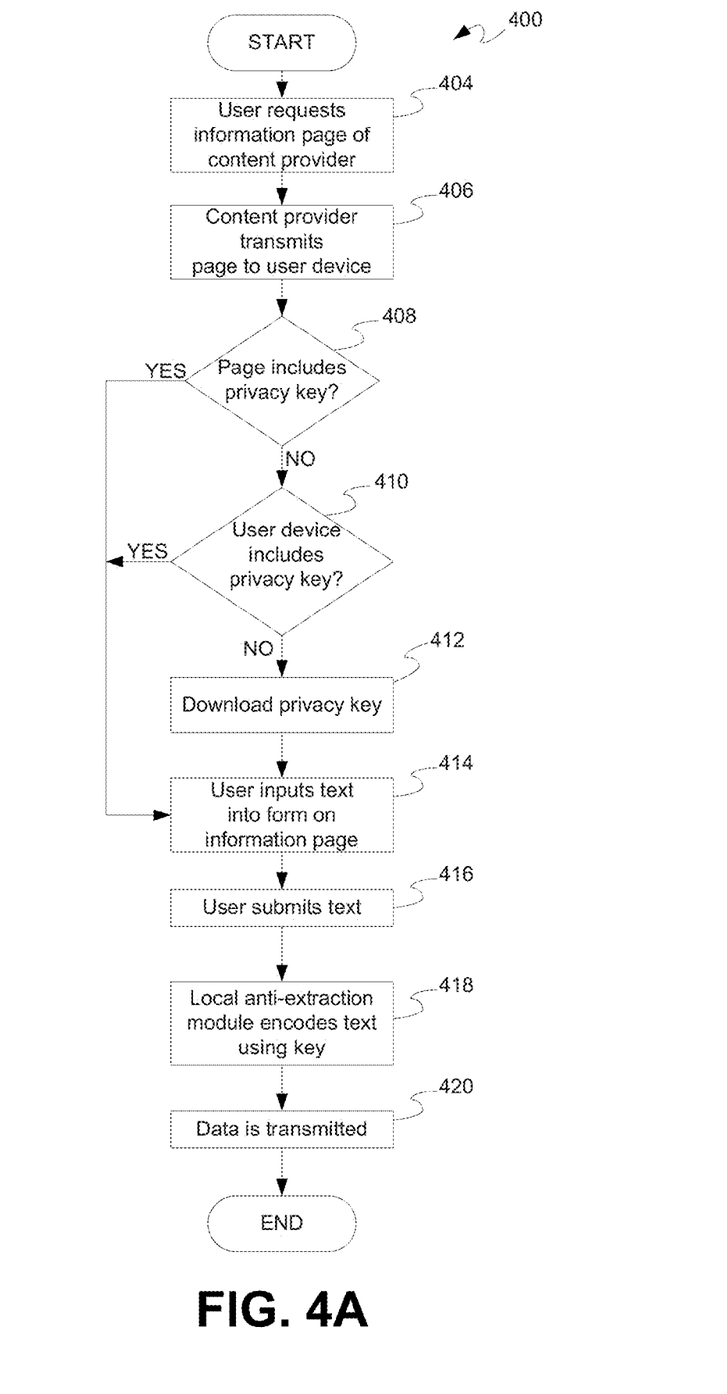
FIG. 4A illustrates an exemplary process for using a privacy key to encode text prior to transmission from a user device to a content provider device through a packet switched network.
Figure 4B:
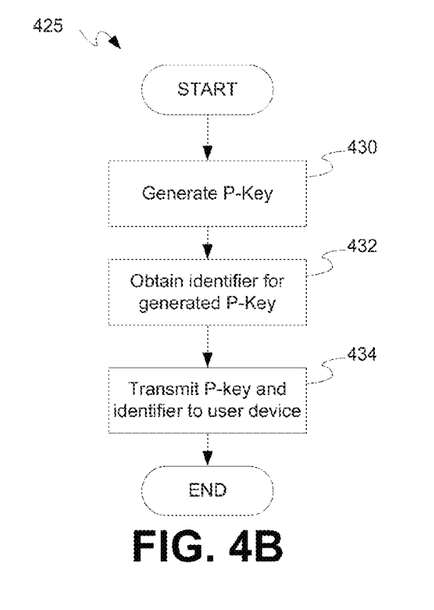
FIG. 4B illustrates an exemplary process for generation and transmission of a privacy key.
Figure 4C:
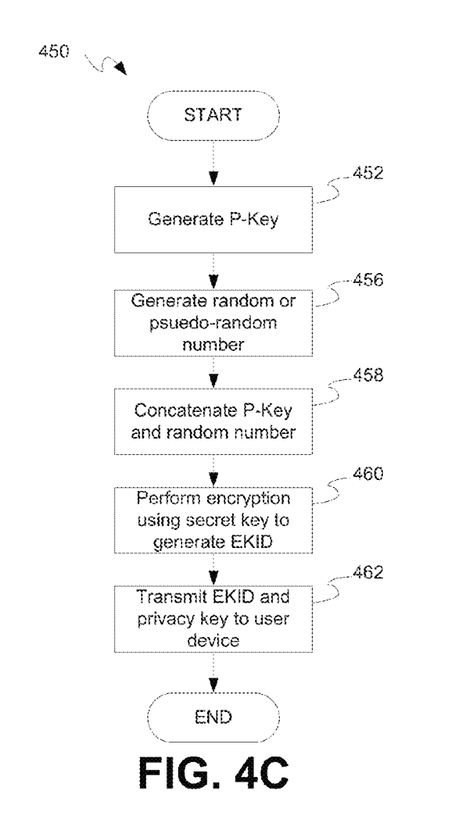
FIG. 4C illustrates another exemplary process for generation and transmission of a privacy key.

FIG. 3 illustrates a high level exemplary process 300 for preventing an extraction module 116 from obtaining useful data extracted from user 102 communications. As discussed in more detail with respect to the following steps 302-308, according to process 300 a content provider 110 uses an anti-extraction module 112 to prevent a third party using an extraction module 116 from extracting useful data from user 102 requests to content provider 110. Further examples of how specific aspects of process 300 could be implemented are illustrated in FIGS. 4A-4C, discussed below.

Process 300 begins at a step 302, in which a user 102 accesses an information page 106 from content provider device 110. The information page 106 from content provider device 110 includes the capability for the user 102 to make a request, for example, by entering data into a form provided in a web page or by clicking a hyperlink, etc.

Next, at step 304, user 102 submits a request to the content provider 110 by entering data into a form provided in a web page and completing the steps necessary to submit the web page request to the content provider, or by clicking a hyperlink, or by any other mechanism by which data can be submitted to the content provider. This data is generally encrypted by local anti-extraction module 107 according to a privacy key stored on device 104 such as described in more detail below.

Next, at step 306, a third party attempts to extract data from the data stream representing the user 102 request. For example, the third party may capture the URI 200, then read the URI scheme 202 to determine what the format for the rest of the URI 200 is, and parse the rest of the URI 200 accordingly. In this example, the third party may be interested in any part of the URI 200, either the data encapsulated within the query 208 or the fragment 210, or the address indicated by the authority 204 and the path 206. Of course, as noted above, the third party could attempt to extract information from data packets used to provide a page 106, or some other transmission, in lieu of or in addition to attempting to extract information from a URI. Additionally, as noted above, the information may be transmitted in a format other than as a URI 200.

At step 308, the third party's attempt to obtain useful data from the user 102 request data stream is unsuccessful. For example, any or all of scheme 202, authority 204, path 206, query 208 and fragment 210 of URI 200 could be encrypted such that they are meaningless to a third party without the decryption tool. Discussed further below are details concerning mechanisms for blocking the third party from obtaining any useful data from the user 102 request data stream.

Following step 308, process 300 ends.

FIG. 4A illustrates an exemplary process for blocking data extraction from a user 102 request. In the example of FIG. 4A, the user 102 request is described as a text keyword search. However, a user 102 request may include any text or other content request information that user 102 submits to content provider 110, and is not limited to keyword searches.

Process 400 begins at step 404, in which user 102 requests an information page 106 from content provider device 110.

Next, at step 406, content provider 110 transmits the page 106 to user device 104. For example, a page 106 including hypertext markup language (HTML), and possibly scripts or other instructions embedded in the HTML, may be downloaded and stored temporarily on user device 104. The information page 106 includes data to interact with user device 104, for example, using HTML and/or a script in a language and format compatible with a web browser or the like included in user device 104. As noted above, such script may include local anti-extraction module 107, or instructions to invoke or instantiate module 107, which may have been previously downloaded to and installed on device 104. In either case, module 107 generally begins execution as part of this step 406 as a consequence of downloading page 106.

Advantageously, the page 106 provided as described with respect to step 406 may include instructions for encrypting only a portion of information passed between user device 104 and content provider device 110. For example, a user 102 may enter data in a form, e.g., an HTML form, which data is then submitted to content provider device 110. Instructions in page 106 may provide that only the information taken from the HTML form, and not other information transmitted from user device 104 to content provider device 110, may be encrypted. Prior mechanisms such as HTTPS and SSL, in contrast, would require that all information transmitted during a connection session be encrypted, thus engendering significantly greater network and computational overhead, and likely greater latency in communications, than mechanisms disclosed herein.

Next, at step 408, the module 107 determines whether the page 106 received in step 406 includes one or more security mechanisms. Such security mechanisms may be an encryption key or the like, and are sometimes referred to as privacy keys. A security mechanism that includes multiple privacy keys may be referred to as a keyset. A privacy key and other information as discussed in more detail below, such as an identifier for the privacy key, may be included in a script or the like that is included in information page 106. Further, a privacy key may be sent in a secure mode, such as HTTPS, even when the rest of page 106 is sent in a mode that is not secure, e.g., via HTTP. Although HTTPS and the like may involve more overhead than HTTP and the like, the minimal additional overhead incurred by transmitting a privacy key, which generally does not include an unduly large amount of data, and which is generally transmitted infrequently, via HTTPS is outweighed by the benefit of having the privacy key shielded from third parties, including extraction module 116.

Of course, step 408 may be omitted, and module 107 may be programmed to simply determine whether a privacy key and any other necessary information is stored in a browser content caching mechanism, cookies or the like, etc., on device 104 as discussed further below. In any event, if module 107 determines that a privacy key and any other necessary information is included in page 106, or is programmed to proceed on the assumption that such data is included in page 106, then process 400 proceeds to step 414. Otherwise, process 400 proceeds to step 410.

In step 410, local anti-extraction module 107 determines whether the user device 104 includes security information provided by anti-extraction module 112, e.g., a privacy key and an identifier for the privacy key, from a previous access to information page 106 or related pages 106, or by some other mechanism. For example, another mechanism for providing a privacy key and an identifier for a privacy key could include a download of the privacy key and the identifier prior to accessing a page 106 requiring a response that it would be desirable to keep secure from extraction module 116. In any event, the anti-extraction module 112 may, for example, install cookies or the like on user device 104, or may use browser caching mechanisms, etc. to shorten the access time for the next user 102 access to the same or a related information page 106. Such stored or cached information may include security mechanisms such as those discussed above and below. Stored or cached security information advantageously may be re-used across different user sessions, e.g., to encrypt different data submitted at different times, e.g., during different user sessions, from a user device 104 to a content provider device 110. If local anti-extraction module 107 determines that it has information concerning anti-extraction module 112 from a previous access to information page 106 or the like, then process 400 proceeds to step 414. Otherwise, step 412 is executed next.

At step 412, if the result of the query of step 410 is a determination that there is no security information already included on user device 104, then device 104, e.g., according to instructions included in module 107, indicates to content provider 110 that security information should be generated. Content provider 110, through anti-extraction module 112, then generates security information such as a key or keyset which is then downloaded to and installed on user device 104. As should be clear, the security information used in process 400 generally includes one or more privacy keys. As mentioned above, it is generally desirable to provide the privacy key via a security mechanism such as HTTPS. As also mentioned above, use of the privacy key then allows devices 104 and 110 to avoid exchanging other data through computationally expensive or overhead-laden security mechanisms such as HTTPS. More details concerning an exemplary generation and installation of a privacy key on user device 104 are discussed with respect to FIGS. 4B and 4C, described below. Following step 412, process 400 proceeds to step 414.

Steps 410 and 412, among other subject matter in this disclosure, exemplify a significant advantage over prior security mechanisms. For example, as discussed above, a security protocol such as HTTPS generally requires encryption keys to be exchanged each time an SSL connection between a content provider device 110 and a user 102, or content consumer, is established. Processes disclosed herein, on the other hand, generally permit for less frequent exchanges of keys. For example, presently disclosed processes allow for avoiding the computationally expensive negotiation of encryption keys required by SSL. Thus, processes disclosed herein advantageously provide for a security mechanism with potentially less latency, and less computational overhead, than prior security mechanisms.

Continuing with the description of process 400, at step 414, user 102 enters data, e.g., keywords or the like, into a form provided for such data entry by information page 106, e.g., an HTML form.

Next, at step 416, user 102 submits the data entered in step 414, e.g., a keyword search request, to the content provider device 110. For example, the user 102 may press an "Enter" key or the like on a user device 104 keyboard, or may select "Submit" on information page 106 with a user device 104 pointing device. However, before the request is actually transmitted to content provider device 110, encoding is performed as described with respect to step 418 below.

Next, at step 418, local anti-extraction module 107 uses the privacy key on user device 104 to encrypt the request submitted in step 416. All or any part of the submitted data, including the scheme 202, authority 204, path 206, or query 208 may be encoded.

Next, at step 420, the encoded data is transmitted to content provider 110. Also transmitted to content provider device 110 is the key identifier, e.g., as described in more detail below with respect to FIGS. 4B and 4C. However, certain of the techniques mentioned herein, such as the use of asymmetric keys, may not require storage of a key identifier on device 104, or transmission of a key identifier to device 110.

Other data, e.g., data that is not encoded or encrypted, may be transmitted to content provider device 110 as well. Advantageously, computational overhead of encryption is reduced by only encrypting data determined to be sensitive and a candidate for interception by extraction module 116. For example, a visitor to a web page may complete multiple HTML form fields with data to be submitted to content provider device 110. However, less than all of the form fields may receive data that should be protected from extraction module 116. Further, encrypting only the data in the subset of form fields that is vulnerable or sensitive, i.e., that should be protected from extraction module 116, is computationally less expensive than encrypting all of the data input into every form field in an information page 106 that captures data for submission to content provider device 110. Accordingly, java script or the like could be included in page 106 and used at least in part to specify particular form fields, within which data should be encrypted. Similarly, certain data in page 106 provided to device 104 could be sensitive, and therefore encrypted for decryption with the privacy key, while other data in page 106 could be transmitted in unencrypted form.

Process 400 ends after step 420. Steps 408, 410, and 412, may occur after user 102 submits a request at step 416 without substantially altering the outcome of process 400. Furthermore, as mentioned above, transmitting the key from content provider 106 to user device 104 is generally, although not necessarily, performed with a secure connection, for example, according to HTTPS as may be used in an IP network. In addition, as alluded to in the previous paragraph, the privacy key described herein could be used for decryption on user device 104 as well as for encryption. For example, page 106 could specify that certain data included in page 106 should be decrypted, using the privacy key, before being rendered for display to user 102. Moreover, device 110 could query user device 104 to obtain the privacy key identifier discussed herein, or device 104 could provide the privacy key identifier when requesting a page 106. In any event, device 110 could use the provided privacy key identifier to encrypt sensitive data included in page 106 according to a privacy key associated with the particular device 104 to which the page 106 is being provided.

Although process 400 includes a description of encrypting form data submitted through page 106 and included in a URI string submitted to content provider device 110, this description is exemplary and not limiting. In fact, a wide variety of data could be encrypted using the privacy key generated as described with respect to process 400. For example anti-encryption module 112 could encrypt some or all of other types of requests, e.g., the body of a request such as an HTTP "POST" request. Further, as explained in the previous two paragraphs, the roles of user device 104 and content provider device 110 could be reversed with respect to generating and providing the privacy key, and data sent from content provider device 110 to user device 104 could be encrypted. For example, some of all of a page 106 could be encrypted.

FIG. 4B illustrates an exemplary process 425 in which the content provider 110 generates a privacy key and a privacy key identifier for transmission to user device 104.

In step 430, remote anti-extraction module 112 on content provider device 110 generates a privacy key (referred to in FIGS. 4B and 4C as a P-Key). For example, generating a privacy key may mean simply that a privacy key is retrieved, randomly, in round-robin order, etc., from a pool of such keys stored on or accessible by the device 110, or generated according to some other mechanism for generating such keys. A privacy key may be generated, as described above, in response to a request or some other mechanism initiating a download of the privacy key to a user device 104.

Retrieving privacy keys from a pool of pre-provided keys reduces the computational overhead that would be engendered by newly creating a privacy key in response to every request from a user device 104 requiring a privacy key. However, a unique or substantially unique privacy key provides better protection against tactics that may be employed, e.g., by extraction module 116, to circumvent privacy keys. For example, if privacy keys are stored in a pool including a limited number of privacy keys, extraction module 116 could include instructions for emulating multiple user devices 104, in an attempt to obtain all or practically all of the privacy keys stored in the pool on content provider device 110. Thus, generating a unique or substantially unique privacy key when it is requested, and then storing the privacy key in association with the identifier described with respect to the following step 432, may prevent extraction module 116 from misappropriating and circumventing the privacy key.

Further, the privacy key could be an asymmetric public key associated with a secret privacy key stored on device 110. Use of an asymmetric key may consume computational overhead that would not result from use of a key that is not asymmetric. Nonetheless, an asymmetric key provides the advantage of reducing the number of privacy keys that need to be maintained for distribution to user devices 104 because public keys are intended for re-use, and are intended to be discoverable by third parties such as extraction module 116.

Continuing with the description of process 425, next, at step 432, device 110 generates an identifier for the privacy key generated in step 452. The identifier is generally a unique or substantially unique identifier, generated using a process such as described above in step 430 for generating a privacy key. For example, such identifier may be stored in association with the privacy key within device 110. In approaches where substantially unique privacy keys are generated by module 112, such as described above with respect to step 430, it is possible that module 112, executing within device 110, may generate the unique or substantially unique identifier for the privacy key in step 432. Such privacy key identifiers may be associated with a privacy key in a one-to-one manner or in a many-to-one manner. For instance, when a privacy key identifier is associated with a privacy key in a many-to-one manner, i.e., many privacy key identifiers correspond to one privacy key, the privacy key identifier may depend upon (or vary by) not only the privacy key, but also by the requesting user 102 or user device 104. That is, a unique or substantially unique privacy key identifier could be associated with each privacy key-device 104 combination or privacy key-user 102 combination, as opposed to a unique or substantially unique privacy key identifier being associated with a privacy key alone.

Associating a unique or substantially unique privacy key identifier with the requesting user 102 and/or user device 104 is a further tactic that could be used to prevent extraction module 116 or the like from circumventing the privacy key. Thus, device 110 could store a plurality of identifiers that each were associated with a privacy key. If extraction module 116 attempted to emulate multiple users 102 and/or devices 104, extraction module 116 would receive different privacy key identifiers for privacy keys provided for each emulated user 102 and/or device 104. Preventing the extraction module 116 from being able to determine an association between a particular privacy key identifier and a particular privacy key thereby further minimizes the risk that the privacy key can be circumvented. Moreover, providing different identifiers for each user 102, rather than actually providing unique or substantially unique identifiers for each privacy key to be used across all users 102, as described in the previous paragraph, may require less computational overhead, and/or less consumption of storage space, on device 110.

Continuing with the description of process 425, next, at step 432, device 110 generates an identifier for the privacy key generated in step 430. The identifier is generally a unique or substantially unique identifier, generated using a process such as described above in step 430 for generating a privacy key. For example, such identifier may be stored in association with the privacy key within device 110. In approaches where substantially unique privacy keys are generated by module 112, such as described above with respect to step 430, it is possible that module 112, executing within device 110, may generate the unique or substantially unique identifier for the privacy key in step 432. Such privacy key identifiers may be associated with a privacy key in a one-to-one manner or in a many-to-one manner. For instance, when a privacy key identifier is associated with a privacy key in a many-to-one manner, i.e., many privacy key identifiers correspond to one privacy key, the privacy key identifier may depend upon (or vary by) not only the privacy key, but also by the requesting user 102 or user device 104. That is, a unique or substantially unique privacy key identifier could be associated with each privacy key-device 104 combination or privacy key-user 102 combination, as opposed to a unique or substantially unique privacy key identifier being associated with a privacy key alone.

Following step 434, process 425 ends.

FIG. 4C illustrates an exemplary process 450 in which the content provider 110 generates a privacy key and a privacy key identifier, the privacy key identifier in this case sometimes referred to as an encrypted key identifier (EKID). The EKID is a string that is so named because it includes at least a sub-string, e.g., the privacy key itself, encrypted using a secret key stored on device 110. The secret key is generally a different key than the key that is provided to user device 104, and is sometimes referred to as an "ID creation key." The EKID and the privacy key may then be included in information transmitted to a user device 104, e.g., for storage in a cookie or the like, or included in a script in a page 106, etc. Generation of an EKID is described in detail below.

In step 452, remote anti-extraction module 112 on content provider device 110 generates a privacy key (referred to in FIGS. 4B and 4C as a P-Key). For example, as mentioned above, generating a privacy key may mean simply that a privacy key is retrieved, randomly, in round-robin order, etc., from a pool of such keys stored on or accessible by the device 110, or generated according to some other mechanism for generating such keys.

Next, at step 456, device 110 generates a random or pseudo-random number, or other string that may operate as a nonce. A "nonce" is generally a number, or, more broadly, a string, that only occurs once, or at least whose value is or substantially unique for a user 102 or user device 104.

Next, in step 458, the privacy key generated in step 452 is concatenated with the nonce generated in step 456. Thus, the EKID string transmitted from content provider device 110 to user device 104 as described below generally is a concatenation of the privacy key and the nonce, encrypted as described below with respect to step 460. However, the privacy key could be encrypted as described below in step 460 without being concatenated with the nonce, or after being concatenated with some other string or type of string. The use of a nonce advantageously means that the concatenated string is unique or substantially unique for each user device 104 requesting a privacy key because the nonce, even if not the privacy key, is unique or substantially unique and is generated in response to a particular request by a user 102.

Next, in step 460, the concatenated string created in step 458 is encrypted using a secret key stored on device 110, e.g., an ID creation key. As mentioned above, an ID creation key is an encryption/decryption key that is known only to device 110, and is not shared across any network or with any other device. Accordingly, device 110 may use an ID creation key to encrypt the concatenated string described above with respect to step 458. As noted above, the privacy key may be taken from a limited pool of such keys, and therefore may be transmitted to more than one user device 104. However, because the identifier is concatenated with the nonce as described above, the EKID for the key that is generated in this step 460 is unique or substantially unique.

Next, at step 462, the device 110 transmits the privacy key and the EKID to the user device 104. As discussed above, the user device 104 generally persistently stores the privacy key and the EKID, e.g., in a browser caching mechanism, in separate cookies for each of the privacy key and the EKID, etc. The privacy key may be sent in unencrypted form because it is transmitted rarely or only once, although as noted above it is generally sent according to a secure mechanism such as HTTPS. The EKID may be transmitted many times from the user device 104 to the content provider device 110, but the EKID, including the encrypting privacy key most likely concatenated with a nonce presents minimal risk if intercepted by an unfriendly third party.

Process 450 ends after step 462.

Content provider device 110, e.g., anti-extraction module 112, uses a process similar to process 450 when receiving an EKID and a string of encrypted information from a user device 104. For example, when receiving an EKID, the device 110 may include instructions for applying the secret key and decrypting the EKID, yielding the concatenated string of the nonce and the privacy key. After parsing the string resulting from decrypting the EKID, the device 110 may isolate the privacy key from the nonce, and use the privacy key to decrypt the string of encrypted information received from a user device 104. Thus, information from a user device 104, such as a search query or other request for information, may be transmitted from a user device 104 to a content provider device 110 with little or no risk of the transmitted information being understood even if it is intercepted by a third party, e.g., by extraction module 116. Note that, although the EKID is referred to as a privacy key identifier, the nonce is included to obfuscate the privacy key encrypted within the EKID string, and it is the privacy key, without the nonce, that is actually used to decrypt the information sent by the user 104. That is, the privacy key is extracted from the EKID when the EKID is decrypted using the secret key, and the privacy key is isolated from the nonce.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided could be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
   generating a privacy key generating an information page that includes instructions to use the privacy key to encrypt at least a subset of data that may be submitted in response to the information page;
   transmitting the privacy key to a remote device via a network;
   transmitting the information page to the remote device via the network in response to a request; and
   generating an identifier for the privacy key; and
   wherein transmitting the privacy key includes transmitting the identifier along with the privacy key to the remote device via the network,
   wherein the identifier for the privacy key is a unique identifier from a plurality of identifiers and is generated using an asymmetric public key associated with a device or user specific key.

2. The method of claim 1, further comprising encrypting the privacy key.

3. The method of claim 1, further comprising:
   generating a unique string;
   concatenating the unique string with the privacy key, thereby generating a concatenated string;
   encrypting the concatenated string, according to a secret key, thereby generating an encrypted string; and
   transmitting the encrypted string along with the privacy key to the remote device via the network.

4. The method of claim 3, further comprising:
   receiving the encrypted string from the remote device via the network;
   receiving the at least a subset of data encrypted by the privacy key from the remote device via the network;
   decrypting the encrypted string, using the secret key, to obtain the privacy key; and
   using the privacy key to decrypt the at least a subset of data.

5. The method of claim 1, wherein the request is made after transmitting the privacy key and an identifier for the privacy key to the remote device via the network.

6. The method of claim 1, further comprising storing the privacy key on a non-transitory computer-readable medium.

7. The method of claim 1, wherein generating the privacy key comprises:
   retrieving the privacy key from a pool of privacy keys based on random selection.

8. The method of claim 1, wherein generating the privacy key comprises:
   retrieving the privacy key from a pool of privacy keys based on a round-robin order.

9. The method of claim 1, wherein generating the privacy key comprises:
   generating the privacy key in response to a request based on a security mechanism, the security mechanism being a mechanism from a list including hypertext transfer protocol over secure socket layer.

10. A system, comprising a computing device having a processor and a memory, the memory storing instructions executable by the processor whereby the computing device is configured to:
    generate a privacy key;
    generate an information page that includes instructions to use the privacy key to encrypt at least a subset of data that may be submitted in response to the information page;
    transmit the privacy key to a remote device via a network;
    transmit the information page to the remote device via the network in response to a request; and
    generate an identifier for the privacy key;
    wherein transmitting the privacy key includes transmitting transmit the identifier along with the privacy key to the remote device via the network, wherein the identifier for the privacy key is a unique identifier from a plurality of identifiers and is generated using an asymmetric public key associated with a device or user specific key.

11. The system of claim 10, wherein the computing device is further configured to:
   generate a unique string;
   concatenate the unique string with the privacy key, thereby generating a concatenated string;
   encrypt the concatenated string, according to a secret key, thereby generating an encrypted string; and
   transmit the encrypted string along with the privacy key to the remote device via the network.

12. The system of claim 11, wherein the computing device is further configured to:
   receive the encrypted string from the remote device via the network;
   receive the at least a subset of data encrypted by the privacy key from the remote device via the network;
   decrypt the encrypted string, using the secret key, to obtain the privacy key; and
   use the privacy key to decrypt the at least a subset of data.

13. The system of claim 10, wherein the computing device generates the privacy key by being configured to:
   retrieve the privacy key from a pool of privacy keys based on random selection.

14. The system of claim 10, wherein the computing device generates the privacy key by being configured to:
   retrieve the privacy key from a pool of privacy keys based on a round-robin order.

15. The system of claim 10, wherein the computing device generates the privacy key in response to a request based on a security mechanism, the security mechanism being a mechanism from a list including hypertext transfer protocol over secure socket layer.

16. A system, comprising a computing device having a processor and a memory, the memory storing instructions executable by the processor whereby the computing device is configured to:
   generate a privacy key;
   generate an information page that includes instructions to use the privacy key to encrypt at least a subset of data that may be submitted in response to the information page;
   transmit the privacy key to a remote device via a network;
   transmit the information page to the remote device via the network in response to a request;
   generate a unique string;
   concatenate the unique string with the privacy key, thereby generating a concatenated string;
   encrypt the concatenated string, according to a secret key, thereby generating an encrypted string;
   wherein transmitting the privacy key includes transmitting the encrypted string along with the privacy key to the remote device via the network;
   receive the encrypted string from the remote device via the network;
   receive the at least a subset of data encrypted by the privacy key from the remote device via the network;
   decrypt the encrypted string, using the secret key, to obtain the privacy key; and
   use the privacy key to decrypt the at least a subset of data.

17. The system of claim 16, wherein the computing device is further configured to:
   generate an identifier for the privacy key; and
   transmit the identifier along with the privacy key to the remote device via the network.

18. The system of claim 17, wherein the identifier for the privacy key is a unique identifier from a plurality of identifiers and is generated using an asymmetric public key associated with a device or user specific key.

19. The system of claim 16, wherein the computing device generates the privacy key by being configured to:
   retrieve the privacy key from a pool of privacy keys based on random selection.

20. The system of claim 16, wherein the computing device generates the privacy key by being configured to:
   retrieve the privacy key from a pool of privacy keys based on a round-robin order.

* * * * *